(12) United States Patent
Knecht et al.

(10) Patent No.: US 10,220,572 B2
(45) Date of Patent: Mar. 5, 2019

(54) PLASTIC PREHEATING ARRANGEMENT FOR A PLASTIC WELDING DEVICE, A PLASTIC WELDING DEVICE AS WELL AS A PREHEATING METHOD FOR A COMPONENT

(71) Applicant: BRANSON ULTRASCHALL Niederlassung der Emerson Technologies GmbH & Co. OHG, Dietzenbach (DE)

(72) Inventors: Gerrit Knecht, Reinheim (DE); Silvio Fuchs, Hasselroth (DE)

(73) Assignee: BRANSON ULTRASCHALL Niederlassung der Emerson Technologies GmbH & Co. OHG, Dietzenbach (DE)

(*) Notice: Subject to any disclaimer, the term of this patent is extended or adjusted under 35 U.S.C. 154(b) by 532 days.

(21) Appl. No.: 14/885,118

(22) Filed: Oct. 16, 2015

(65) Prior Publication Data
US 2016/0107372 A1    Apr. 21, 2016

(30) Foreign Application Priority Data
Oct. 17, 2014   (DE) .................. 10 2014 221 139

(51) Int. Cl.
*B29C 65/14*   (2006.01)
*B29C 65/24*   (2006.01)
(Continued)

(52) U.S. Cl.
CPC ............ *B29C 65/242* (2013.01); *B29C 65/06* (2013.01); *B29C 65/1412* (2013.01);
(Continued)

(58) Field of Classification Search
CPC ... B29C 65/242; B29C 65/06; B29C 65/1412; B29C 65/1432; B29C 65/1467; B29C 65/72
See application file for complete search history.

(56) References Cited

U.S. PATENT DOCUMENTS 4,490,130 A * 12/1984 Konzal ................. B29B 13/025
                                                  432/226
4,596,625 A    6/1986 Alvarez
(Continued)

FOREIGN PATENT DOCUMENTS

CN    103702821 A    4/2014
DE    3514903 A1    11/1985
(Continued)

OTHER PUBLICATIONS

JP Office Action or JP Application No. 2015203728 dated Sep. 28, 2016, 5 pages.
(Continued)

*Primary Examiner* — Daniel McNally
(74) *Attorney, Agent, or Firm* — Reising Ethington P.C.

(57) ABSTRACT

The plastic preheating arrangement for a plastic welding device comprises a support, at least one first preheating device and a pivoting arrangement with which the at least one first preheating device can be pivoted relative to a first surface of the support from a starting position into a preheating position. In this manner, an undercut of a first component can be circumnavigated and the first component can be heated by means of the first preheating device.

16 Claims, 11 Drawing Sheets

(51) Int. Cl.
*B29C 65/72* (2006.01)
*B29C 65/00* (2006.01)
*B29C 65/06* (2006.01)
*F27D 13/00* (2006.01)
B29L 31/00 (2006.01)
B29C 65/20 (2006.01)
B29L 31/30 (2006.01)

(52) U.S. Cl.
CPC ...... *B29C 65/1432* (2013.01); *B29C 65/1467* (2013.01); *B29C 65/72* (2013.01); *B29C 66/0242* (2013.01); *B29C 66/112* (2013.01); *B29C 66/114* (2013.01); *B29C 66/54* (2013.01); *B29C 66/8242* (2013.01); *B29C 66/8322* (2013.01); *B29C 66/8432* (2013.01); *F27D 13/00* (2013.01); *B29C 65/2084* (2013.01); *B29C 66/8221* (2013.01); *B29C 66/8324* (2013.01); *B29L 2031/3055* (2013.01); *B29L 2031/747* (2013.01)

(56) References Cited

U.S. PATENT DOCUMENTS

| | | | |
|---|---|---|---|
| 4,994,224 A | | 2/1991 | Itoh et al. |
| 5,035,045 A | * | 7/1991 | Bowen ................ B29C 65/1412 156/273.3 |
| 5,296,075 A | * | 3/1994 | Hardigg ............. B29C 66/3262 156/362 |
| 5,800,771 A | | 9/1998 | Ohno |
| 6,797,089 B2 | | 9/2004 | Brahm et al. |
| 9,283,713 B2 | | 3/2016 | Heeg |
| 9,440,380 B2 | | 9/2016 | Bruggesser et al. |
| 2003/0164219 A1 | | 9/2003 | Brahm et al. |
| 2013/0092324 A1 | * | 4/2013 | Dietz ................... B05D 3/0227 156/499 |
| 2014/0116371 A1 | | 5/2014 | Bruggesser et al. |
| 2016/0129630 A1 | | 5/2016 | Heeg |

FOREIGN PATENT DOCUMENTS

| | | |
|---|---|---|
| DE | 4313951 A1 | 11/1993 |
| DE | 3854497 T2 | 4/1996 |
| DE | 10122802 A1 | 10/2002 |
| DE | 102011007432 A1 | 10/2012 |
| EP | 0113160 A1 | 7/1984 |
| JP | S5653050 A | 5/1981 |
| JP | 2003252154 A | 9/2003 |
| JP | 2003331837 A | 11/2003 |
| JP | 2010023681 A | 2/2010 |
| JP | 2012125948 A | 7/2012 |
| JP | 2015107524 A | 6/2015 |
| KR | 200343833 Y1 | 2/2004 |
| KR | 1020140043332 A | 4/2014 |

OTHER PUBLICATIONS

JP Decision to Grant for JP Application No. 2015203728 dated Feb. 14, 2017, 6 pages.
KR Notice of Allowance for KR Application No. 1020150144629 dated Sep. 27, 2017, 3 pages.
EP Extended Search Report for EP Application No. 15186321.4 dated Apr. 20, 2016 (4 pages).
CN Office Action for CN Application No. 201510680692.3 dated Jul. 27, 2018 (9 pages).

* cited by examiner

PLASTIC PREHEATING ARRANGEMENT FOR A PLASTIC WELDING DEVICE, A PLASTIC WELDING DEVICE AS WELL AS A PREHEATING METHOD FOR A COMPONENT

CROSS REFERENCE TO RELATED APPLICATIONS

This application claims the priority of German patent application No. DE 10 2014 221 139.5, filed on Oct. 17, 2014. The entire content of this priority application is incorporated herein by reference in its entirety.

TECHNICAL FIELD

The present disclosure relates to a plastic preheating arrangement for a plastic welding device, a plastic welding device as well as a corresponding preheating method for a component in a plastic welding device.

BACKGROUND

Plastic welding devices with a preheating arrangement normally comprise a housing with a lower tool arranged in it as well as an upper tool arranged in it. The lower tool is fastened on a lifting table, whereas the upper tool is fastened rigidly on an upper tool plate. By means of the lifting table, the lower tool can be moved in the direction of the upper tool in order to weld a first component in the lower tool with a second component in the upper tool, for example by means of friction welding. With the preheating arrangement, the first and the second component can normally be heated before the welding. The preheating arrangement is generally hereby coupled to the lifting table.

Such plastic welding devices are used for example in the automobile industry or in medical technology. In the automobile industry, such plastic welding devices are used for producing headlights, but can also be used in the production of other components or component groups that are made of plastics or contain plastics. Similarly, the plastic welding device can be used in the production of devices and/or component groups in medical technology or in the production of consumer goods.

The workflow for the known plastic welding device with a preheating arrangement is as follows. An operator first places a first component into the receiver of the lower tool. He then positions a second component on the first component in the lower tool. The lifting table with the lower tool and the components arranged on it then moves out of a starting position in the direction of the upper tool until the second component rests in the upper tool. The lifting table now moves back into a position, in which the preheating arrangement can be arranged from an idle position in an aligning position between the two components. After the preheating arrangement has been arranged between the two components, the preheating arrangement is positioned in a preheating position through a movement of the lifting table so that the two components are heatable at the points to be welded. After the heating, the preheating arrangement is moved back into the aligning position and then into the idle position. The lifting table is then moved into a welding position. A welding of the first component with the second component now takes place by means of friction welding or by means of the pressing together of the preheated components. After welding is complete, the lifting table with the lower tool and the compound made up of the first and second component arranged in it moves from the welding position back into the starting position. The operator can now remove the compound made up of the first and second component.

A disadvantage of the plastic welding device with a preheating arrangement described above is apparent when components with complex projections or undercuts need to be heated and welded. Since the plastic preheating arrangement is only moved in the vertical position after the aligning position has been reached, the attempt to heat such a component would lead to damage to or destruction of the component and/or of the preheating arrangement. This problem exists analogously for the lower tool. In the field of friction welding, the company BRANSON thus developed a plastic welding device, the lower tool of which can be moved on the lifting table in the space in any manner, in particular along a control line. A movement of the upper tool is not possible due to the forces occurring during the vibration welding or friction welding.

In fact, this plastic friction welding device does not have a preheating arrangement. The arrangement of a conventional preheating arrangement on the lifting table would furthermore only lead to a vertical movement of the preheating arrangement. This also means that damage to or destruction of the projections or undercuts of the component and/or of the preheating arrangement would continue to take place for components with complex projections or undercuts. Moreover, a conventional preheating arrangement is not easily integratable there since, in particular in the case of welding with prior preheating, fast mobility of the preheating arrangement and the lifting table is required. If this fast mobility does not exist, then the plastic is hardened again during welding. However, this would neither lead to the desired cosmetic weld seam nor reduced fluff formation.

One object that may be achieved by at least some implementations of the present invention is thus to provide a plastic preheating arrangement, with which even components with complex undercuts can be preheated. Furthermore, a corresponding plastic welding device as well as a preheating method are provided.

SUMMARY

The above object is solved by a plastic preheating arrangement for a plastic welding device, a preheating method for at least one component in a plastic welding device as well as an infrared plastic welding device. Further advantageous embodiments result from the below description, the drawings as well as the dependent patent claims.

A plastic preheating arrangement for a plastic welding device comprises: a support, at least one first preheating device and a pivoting arrangement with which the at least one first preheating device can be pivoted relative to a first surface of the support from a starting position into a preheating position so that an undercut of a first component can be circumnavigated and the first component can be heated by means of the first preheating device.

For better understanding, the plastic preheating arrangement is described below in use in a plastic welding device. The plastic welding device hereby comprises a first and a second tool. The first tool is preferably arranged on a first support and the second tool on a second support. The first and the second tool are movable relative to each other. In this operational example, the first tool represents an upper tool and the second tool a lower tool. Preferably and in this example, the at least one first preheating device is an infrared preheating device.

For simplification, it is assumed that a first component is already arranged in the first tool and a second component is already arranged in the second tool. Furthermore, the first component has, as an example, a complex undercut. Within the framework of the present disclosure, an undercut is an element of the first component, which protrudes from the first component such that it covers an area of the first component depending on the orientation of the first component in the space. In order to clarify the term undercut, a U-shaped component or area of a component is now assumed. If this U-shaped area is viewed from above or below, it does not contain an undercut, since all areas are freely accessible. However, if the U-shaped area is viewed from the side, then one leg, namely the front leg, covers respectively the other leg, namely the rear leg. One leg thus covers the other leg depending on the orientation of the component in the space. The respective front leg thus represents an undercut in terms of the present disclosure.

It also follows from the above explanation that a movement of the preheating device towards a surface covered by the undercut, for example a surface to be heated, is not possible with a straight-line movement. Referencing again the exemplary U-shaped component or respectively area of a component, the first preheating device moves from the left towards the component. The front, left leg thus represents the undercut to be circumnavigated. The rear, right leg represents the area to be heated. The first preheating device cannot reach the rear leg through a movement alone in the direction of the rear leg, i.e. of the area to be heated, since it would hit the front leg in this case. For clarification, the undercut is thus assumed to be an imaginary point or a curve, which represents the undercut and must be circumnavigated. Only after this circumnavigation can the first preheating device be arranged next to the surface of the first component to be heated. Analogous to the above explanations, this is also clarified later and in reference to the drawings based on a C-shaped area of a component.

Moreover, the first and the second tool are located at a distance from each other, which allows an arrangement of the preheating arrangement in between. This position is called the receiving position. This receiving position can also be a starting position, i.e. the position, which the first and the second tool have in the idle state of the plastic welding device. Furthermore, it is assumed that the first preheating device of the preheating arrangement is already aligned with the first tool.

Starting from the above points, a moving of the first preheating device of the preheating arrangement aligned with the first tool first takes place in the direction of the first tool. During this movement, i.e. simultaneously with the movement, a first pivoting of the first preheating device takes place automatically from a starting position into a preheating position relative to the first surface of the support due to the pivoting arrangement. The starting position is for example a position, in which the first preheating device is arranged at an angle to the first surface of the support of the preheating arrangement.

The pivoting arrangement preferably comprises a pivoting structure, on which the at least one first preheating device is arranged. Additionally, the pivoting structure has a pivoting mechanism. The pivoting structure is pivotably articulated or hinged on the support at at least a first point. At a second point, the pivoting structure engages with the pivoting mechanism. The second point lies particularly preferably on a side of the pivoting structure, which is different from the side, on which the pivoting structure is articulated or hinged on the support. In particular, the first and the second points lie on opposite-lying sides of the pivoting structure. In this manner, the at least one first preheating device is pivotable from the starting position into a preheating position by means of the actuation of the pivoting mechanism.

The pivoting structure thereby provides a support for the preheating device, which is designed for example for differently designed preheating devices. Thus, differently designed preheating devices can be arranged on the support or respectively the pivoting structure without needing to replace the pivoting structure itself.

The first preheating device thus circumnavigates the at least one undercut in the first component through the pivoting. In this manner, the first preheating device is arranged in the preheating position next to the first tool at the end of the movement. In the preheating position, the first preheating device is located for example in an alignment parallel to the first surface of the support of the preheating arrangement.

At least one subarea of the surface of the first component is subsequently heated by means of the first preheating device. This subarea is also called a joint or weld area. A movement of the first preheating device of the preheating arrangement away from the first tool then takes place. At the same time as the movement, a second pivoting of the first preheating device from the preheating position back into the starting position takes place automatically so that the first preheating device again circumnavigates the at least one undercut in the first component. The pivoting arrangement thus now effectuates the reverse pivoting of the first preheating device in comparison to the above first pivoting. At the end of this step, the first and the second tools are again located in the receiving position.

As soon as the first and the second tools have reached the receiving position, the preheating arrangement is moved out of alignment with the first tool. A welding of the first and the second components with each other then takes place in the known manner.

Due to the undercut here for example in the first component in the first tool, i.e. in the upper tool, the second tool must thus be arranged in a movable manner in the space so that the second tool with the second component can circumnavigate the undercut in the first component. This applies in particular for friction welding devices since here a movement of the first tool, i.e. of the upper tool, is not realizable due to the forces occurring during the friction welding. However, in the case of an infrared welding device, the upper tool can also be arranged movably in the space since no friction welding forces act here on the first tool as the upper tool, i.e. in particular no vibrations during the friction welding process. The plastic preheating arrangement can thus be used both in friction welding and in pure or sole infrared welding.

One advantage of the plastic preheating arrangement is thus that a component with a complex undercut is heatable in a simple and cost-effective manner. In further processing or respectively production of the weld connection, this results in the desired cosmetic weld seam as well as reduced fluff formation.

In a preferred embodiment, the angle of rotation resulting between the first preheating device and the support opens or respectively closes through the pivoting movement such that the imaginary point or respectively undercut is circumnavigable at least with a subarea of the first preheating device and the first preheating device is arrangeable next to a second imaginary point lying behind the first as a target point. The target point is for example the surface to be heated. The meaning of the imaginary point or respectively the undercut was already covered in detail above so it is referenced here.

In another preferred embodiment, the pivoting arrangement is pneumatically, electrically or mechanically actuatable. The mechanical actuation is hereby preferred since a further time advantage is associated with it in comparison to the pneumatic or electric actuation. This is because no time loss occurs due to control signals during a sole mechanical actuation and complex position monitoring is not required. This will become particularly clear in the below detailed description referencing the figures.

In a further preferred embodiment, the plastic preheating arrangement also has at least one second preheating device, which is arranged on a second surface of the support opposite the first surface. The second preheating device serves to heat or respectively preheat the second component in the second tool. Depending on the second component in the second tool, the second preheating device is arranged rigidly or analogously to the first preheating device moveably on the support. By means of this design, the plastic preheating device can also be used in a pure or sole infrared plastic welding device.

Advantageously, the plastic preheating arrangement has at least two first preheating devices. By means of this design, for example several components are heatable in one work step, which also saves time. With respect to the headlight use in the automobile industry, a right and a left headlight can be produced at the same time. It is thus also advantageous if the plastic preheating arrangement also has at least two second preheating devices.

In a further preferred embodiment, the plastic preheating arrangement has a lever mechanism for pivoting the first preheating device, wherein the lever mechanism comprises an actuating element. The lever mechanism hereby serves as a pivoting mechanism and represents a technically particularly advantageous design when it comprises a mechanical actuating element.

The resulting functioning of the plastic preheating device during operation is then as follows. Through the movement of the plastic preheating arrangement in the direction of the first tool, the actuating element hits an upper fastening plate or a part of it during the operation of the plastic welding device. The first tool is arranged on this upper fastening plate. If the plastic preheating arrangement is now moved further, then the actuating element is then pushed down and lifts the first preheating device via the lever mechanism. In this manner, the first preheating device moves from the starting position into the preheating position and thereby simultaneously circumnavigates the undercut in the first component. As the plastic preheating arrangement moves away from the first tool, the above steps run in the opposite order. In the mechanical actuation described above, a time loss does not occur due to a position query and the activation by means of control signals is not required. The mechanical actuation is thus automatically particularly advantageous during the movement of the plastic preheating device.

The plastic welding device comprises a first tool, a second tool, wherein the first and the second tool are movable relative to each other, so that components arranged in between are weldable by means of the first and second tool, as well as a plastic preheating arrangement.

The plastic welding device was already discussed in detail above in the description of the plastic preheating arrangement so it is referenced here. The corresponding advantages of the plastic welding device also result from the above description of the plastic preheating arrangement.

In a preferred embodiment, the plastic welding device is a plastic friction welding device or an infrared welding device. In the case of a pure or sole infrared welding device, the plastic preheating arrangement must then also have a second preheating device in addition to the first preheating device so that both components are preheated correspondingly and the desired weld connection results. As already discussed above, in the case of the friction welding device, the upper tool is instead arranged on the upper fastening plate due to the forces occurring during the friction welding. Thus, in the case of the friction welding device, the lower tool must also be movable in the space so that the undercut can be circumnavigated. In the case of the infrared plastic welding device, the upper and/or the lower tool can be arranged movably in the space.

In a further preferred embodiment, the preheating arrangement is movable between an idle position and a preheating position. In the preheating position, a component in the associated tool is heatable by means of the preheating device. There are generally two options with respect to the mobility of the plastic preheating arrangement. In the first case, the preheating arrangement is independently and freely movable in the space. In the second case, the preheating arrangement is coupled to an already existing component of the plastic welding device and follows the corresponding movement. This would be the case for example when the preheating arrangement is coupled on a lifting table of the plastic welding device. In both cases, the preheating method must have the additional steps: moving of the preheating arrangement from an idle position into an operating position so that the first preheating device on the first surface of the support is aligned with the first tool of the plastic welding device and, after completion of the preheating, moving or displacing of the preheating arrangement from the operating position into the idle position.

A further plastic welding device is a pure infrared plastic welding device, which is similar to the plastic welding device described above. However, the pivoting arrangement here is not coupled on the first preheating device but rather on the first and/or second tool. The first tool is again in particular the upper tool. The structure and the functionality of the pivoting arrangement are analogous to the structure of the pivoting arrangement described above for the first preheating device.

For clarification, it is assumed below that the pivoting arrangement is coupled on the first tool, i.e. the upper tool. As the preheating arrangement approaches, the first tool is then pivoted from a starting position into a preheating position. In this manner, the undercut in the first component is also no problem for the preheating arrangement. As the preheating arrangement moves away, the first tool then returns to the starting position. If the second tool now approaches on a lifting table, for example, the first tool then pivots again due to the pivoting arrangement. The undercut is thus also circumnavigated here and proper welding of the first component with the second component is realizable.

The preheating method for at least one component in a plastic welding device with a preheating arrangement, in particular a plastic welding device comprises the steps: moving of a first preheating device of the preheating arrangement aligned with a first tool in the direction of the first tool, wherein a first pivoting of the first preheating device takes place simultaneously automatically from a starting position into a preheating position relative to the first surface of the support due to a pivoting arrangement, so that the first preheating device circumnavigates at least one undercut in the first component and the first preheating device is arranged in the preheating position next to the first tool, then heating of at least one subarea of the surface of the first component by means of the first preheating device, then moving of the first preheating device of the preheating arrangement away from the first tool, wherein a second pivoting of the first preheating device from the preheating position back to the starting position takes place simultaneously automatically so that the first preheating device circumnavigates the at least one undercut in the first component.

The preheating method was already described above in connection with the plastic preheating arrangement. The corresponding explanations as well as the resulting advantages are thus referenced here.

The preheating method can naturally also be used analogously in an alternative embodiment and referencing the pure or sole infrared welding device with the pivoting arrangement coupled to at least one of the tools. In this case, a pivoting of the respective tool then takes place during an approach or a moving away of the preheating arrangement. The same then naturally applies to the approach or moving away of the remaining tools for the welding of the components to each other.

In a preferred embodiment, the preheating method comprises the further steps: moving of the preheating arrangement, in particular of the preheating arrangement, before or during the moving in the direction of the first tool from an idle position into an operating position so that the first preheating device on the first surface of the support is aligned with the first tool of the plastic welding device, and moving of the preheating arrangement from the operating position into the idle position after the heating of the component. The advantages of this were also already explained above in connection with the plastic welding device.

In a just as preferred embodiment, the automatic pivoting takes place by means of an actuating element of a pivoting mechanism of the pivoting arrangement, wherein the actuating element is a pneumatic, an electric or preferably a mechanical actuating element. With respect to this embodiment of the method, we also refer to the plastic preheating arrangement and the process flow described there.

BRIEF DESCRIPTION OF THE DRAWINGS

The present disclosure is set forth in more detail below and with reference to the drawings. The same reference numbers in the drawings indicate the same components. They show in.

DETAILED DESCRIPTION OF PREFERRED EMBODIMENTS

An embodiment of the plastic preheating arrangement is described below in use in a plastic welding device. The plastic welding device is used for example in the automobile industry for the production of headlights, in medical technology or in the consumer goods industry for the production of components or component groups made of plastic.

Figure 1:
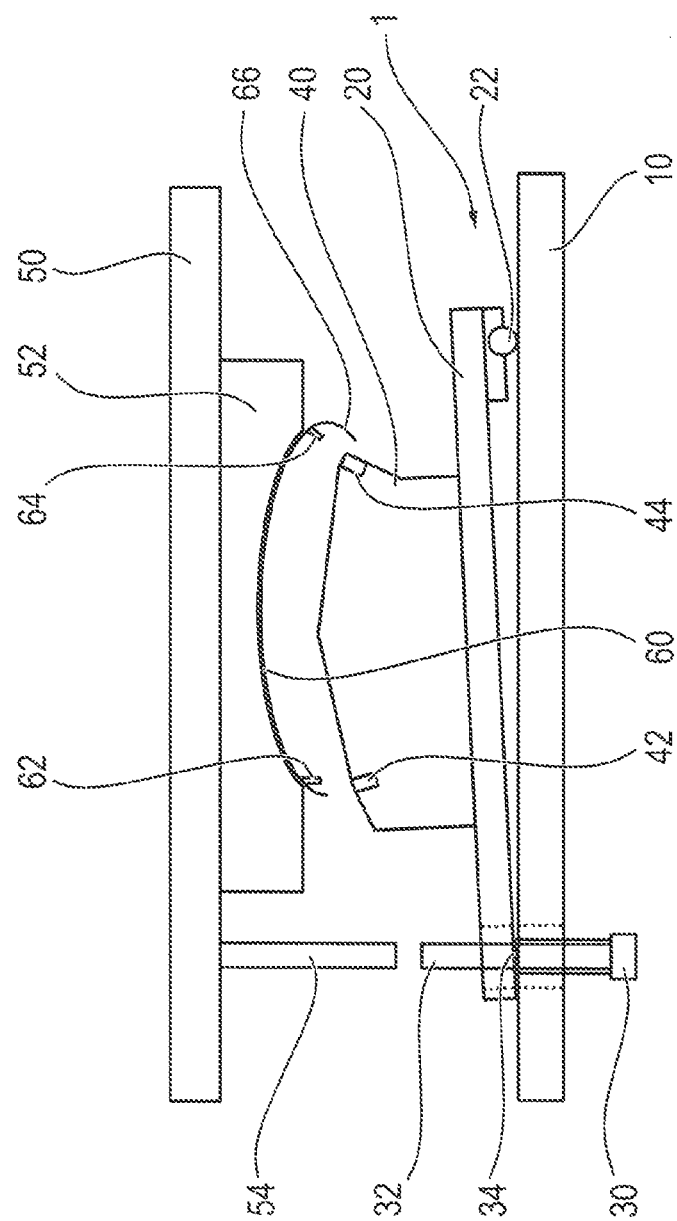
FIG. 1 a schematic side view of an embodiment of a plastic preheating arrangement in a starting position, FIG. 2 a schematic front view of the embodiment of a plastic preheating arrangement from FIG. 1 in a starting position, FIG. 3 a schematic side view of the embodiment of a plastic preheating arrangement from FIG. 1 in a preheating position, FIG. 4 a schematic front view of the embodiment of a plastic preheating arrangement from FIG. 1 in a preheating position, FIG. 5 a perspective view of an embodiment of a plastic preheating arrangement in a preheating position, FIG. 6 a front view of the embodiment according to FIG. 5, FIG. 7 a perspective view of a further embodiment of the plastic preheating arrangement, FIG. 8 a perspective view of an embodiment of a pivoting arrangement of the plastic preheating arrangement, FIG. 9 a perspective view of an embodiment of a plastic welding device, FIG. 10 a front view of the embodiment of the plastic welding device from FIG. 9, and FIG. 11 a schematic process flow of an embodiment of a preheating method.
Figure 2:
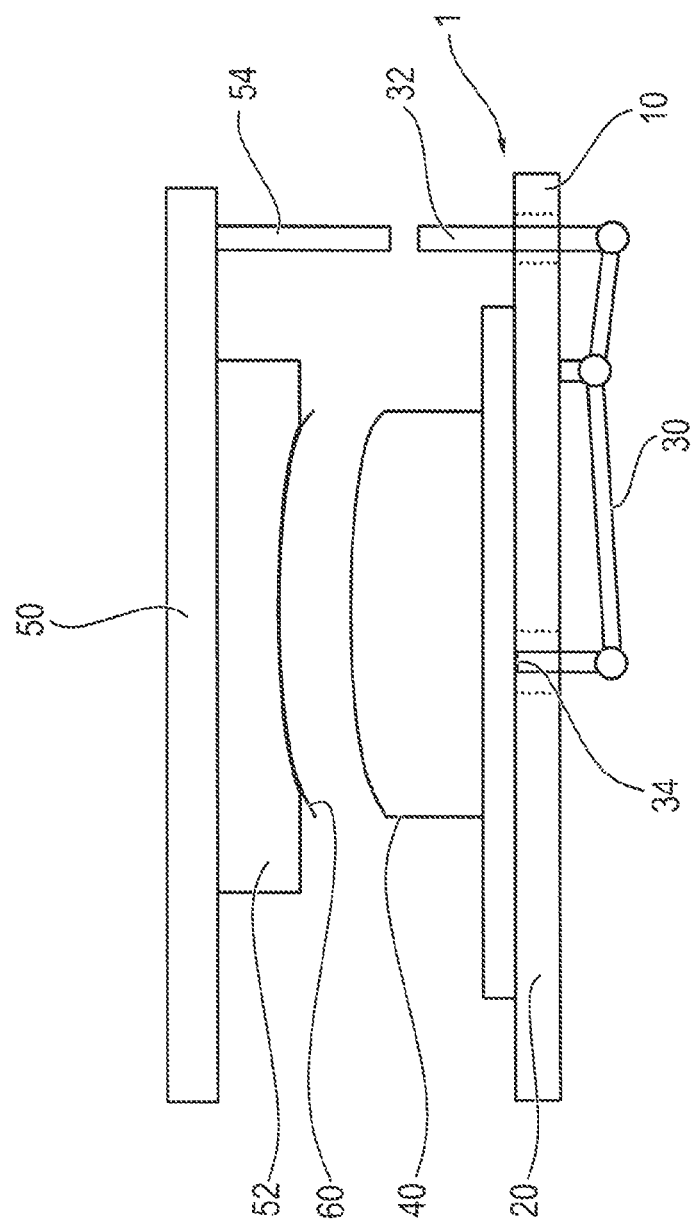

FIG. 1 shows a greatly simplified schematic side view of a plastic preheating arrangement 1 and FIG. 2 the associated front view. The plastic preheating arrangement 1 comprises a support 10 on which a pivoting structure 20 is arranged. The pivoting structure 20 is articulated or hinged at a first point 22 on the support 10, preferably at two first points 22. The first point 22 thus provides a pivot point or preferably an axis of rotation for the pivoting structure 20. A first preheating device 40, preferably an infrared preheating device, is arranged on the pivoting structure 20. The first preheating device 40 has two radiation sources, a first radiation source 42 and a second radiation source 44. The first 42 and the second radiation source 44 can be both a joint radiation source, such as for example a heating circuit, as well as two independent radiation sources.

In FIGS. 1 and 2, the pivoting structure 20 and thus also the first preheating device 40 are located on the pivoting structure 20 in a starting position. As can be easily seen, the pivoting structure 20 and thus also the first preheating device 40 are arranged in this starting position diagonal or respectively angled with respect to the surface of the support 10.

For further clarification, an upper fastening plate 50 of a plastic welding device 3 is shown in FIGS. 1 and 2. A first tool 52 and a release element 54 are arranged on the upper fastening plate 50. The functionality of the release element 54 will be described in detail later. A first component 60, which has a first projection 62, a second projection 64 as well as a third projection 66, which defines an undercut, is located in the first tool 52. In the schematic representations in FIGS. 1 to 4, the first 62 and the second projection 64 represent as an example the joint area or respectively the joint zone.

As already explained above, an undercut is an element of the first component 60, which protrudes from the first component 60 such that it covers an area of the first component depending on the orientation of the first component 60 in the space. In the present example, this is in particular a section of the joint area. The undercut thus prevents a movement of the first preheating device 40 exclusively along an axis towards a surface of the component 60 to be heated. Relating to FIGS. 1 to 4, the third projection 66 with the adjacent area of the first component 60 forms an undercut with a convex shape. This area is in particular C-shaped. The area covered by the third projection 66 is here the area of the first component, which lies to the right of an imaginary vertical line from the third projection 66 in the direction of the first component 60. This covered area of the first component 60 cannot be reached alone by means of an, in the present example, vertical movement of the first preheating device 40. This will be described in detail later when describing the functioning.

Furthermore, the pivoting arrangement 1 comprises a pivoting mechanism 30 with an actuating element 32. The pivoting mechanism 30 is in particular a lever mechanism. The pivoting mechanism 30 engages at a second point 34 on the pivoting structure 20. Upon actuation of the actuating element 32 for example through the release element 54, the first preheating device 40 pivots from the starting position into a preheating position.

Figure 5:
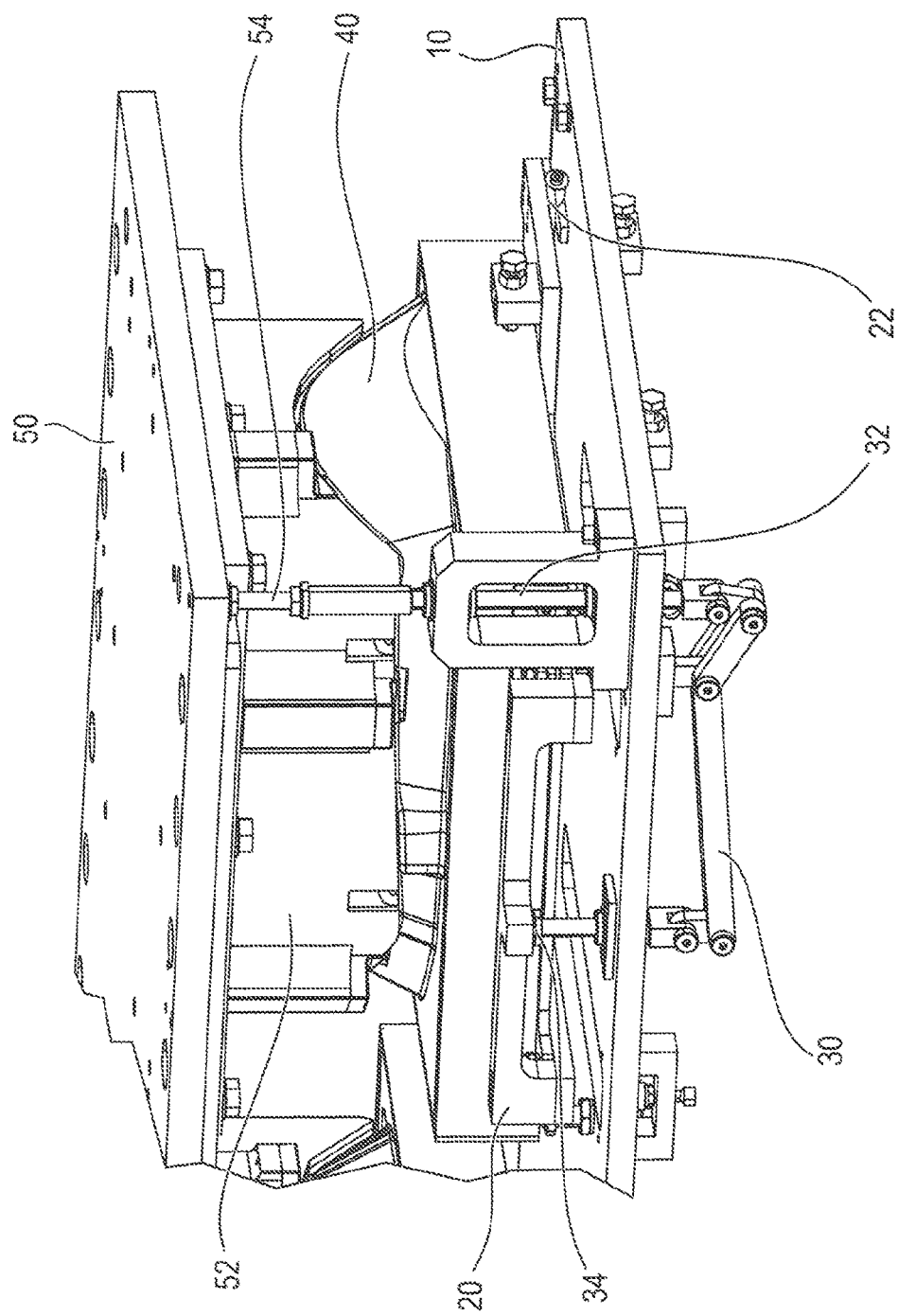
Figure 6:
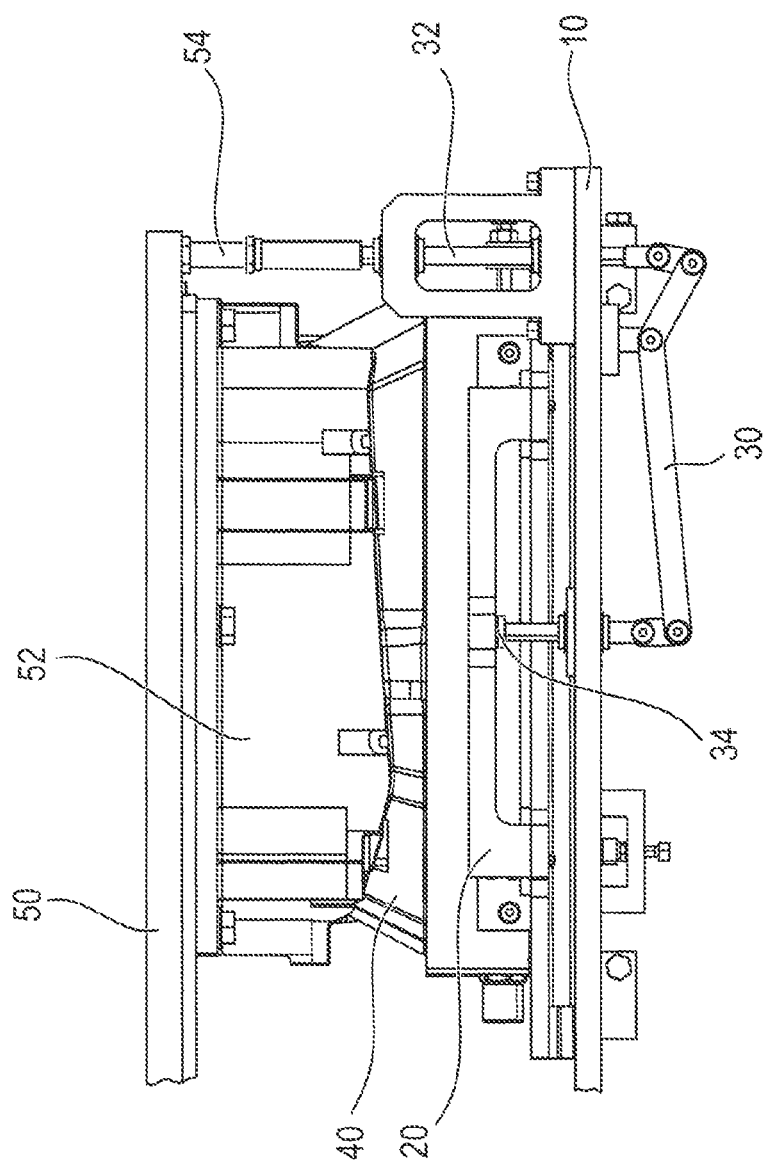

The third projection 66 of the first component 60 is thus circumnavigable by means of the plastic preheating arrangement 1 so that the first preheating device 40 can be arranged next to the first component 60. For clarification, the greatly simplified schematic FIGS. 3 and 4 as well as FIGS. 5 and 6 are referenced below.

Figure 3:
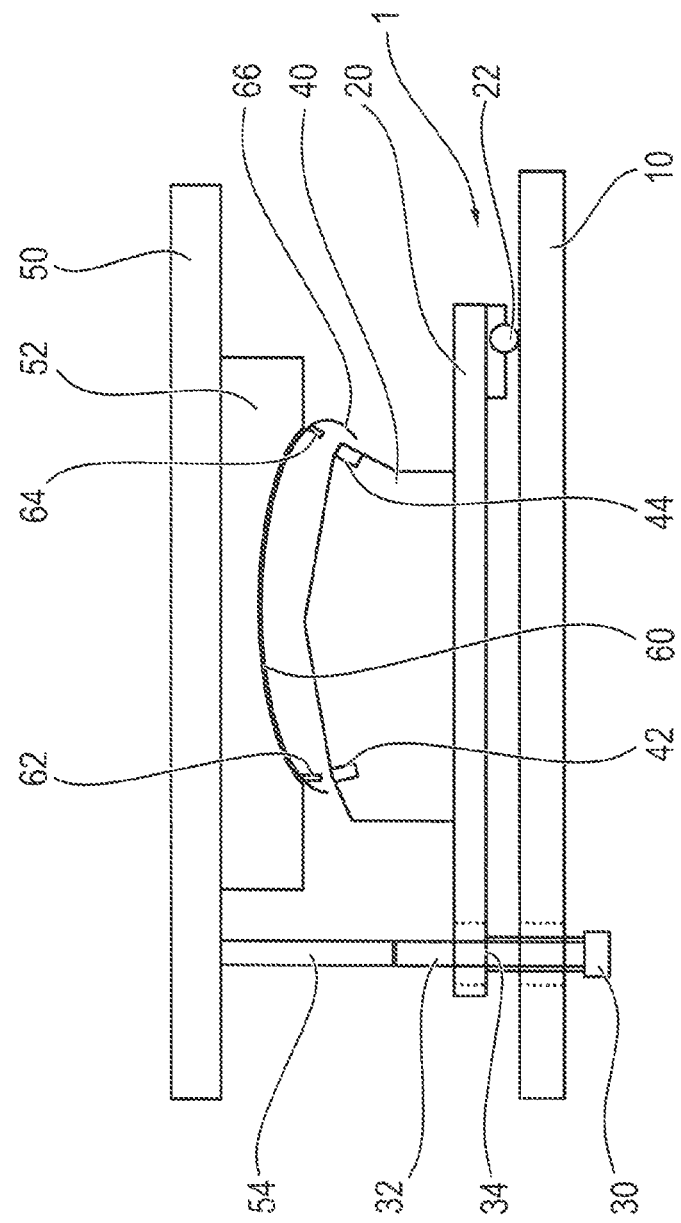
Figure 4:
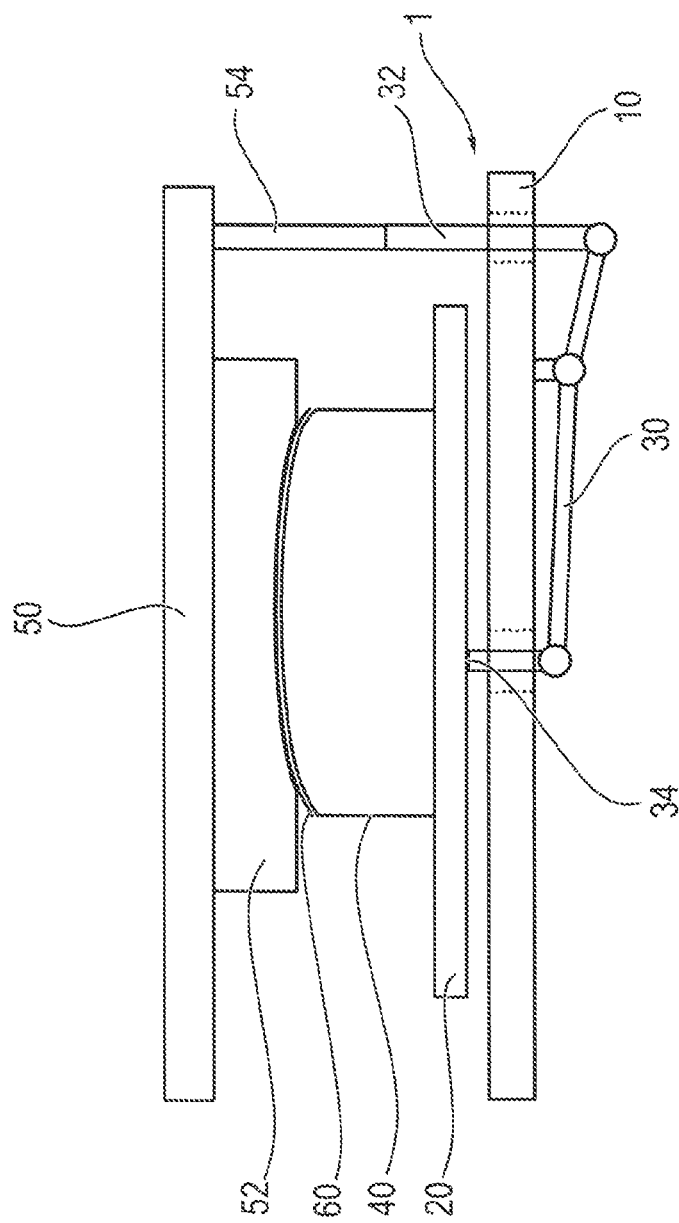

The pivoting structure 20 and thus also the first preheating device 40 are located in the preheating position in FIGS. 3 and 4 as well as 5 and 6. The first radiation source 42 is arranged next to the first projection 62 and the second radiation source 44 is arranged next to the second projection 64. The third projection 66 or respectively the undercut was circumnavigated by the first preheating device 40. The circumnavigation automatically takes place during a movement of the support 10 in the direction of the upper fastening plate 50. As soon as the release element 54 engages with the actuating element 32, the pivoting structure 20 is lifted at the second point 34 by the pivoting mechanism 30. Since the pivoting structure 20 is pivotably articulated on the opposite end at the first point, a pivoting of the pivoting structure 20 takes place around this axis of rotation. An angle of rotation resulting from the pivoting movement hereby preferably opens in the same direction as a surface with adjacent undercut in the first component 60. Relating to FIGS. 1 and 4, the third projection 66 forms the undercut and is available, when observed with the adjacent area of the first component 60, as a convex shape or C shape. This convex shape is open towards the component interior, i.e. to the left in the example. The angle of rotation resulting during the pivoting movement of the first preheating device 40 is also open to the left. This results from the fact that the first point 22, at which the pivoting structure 20 is articulated or hinged on the support 10, is arranged in the present example on the same side as the undercut or respectively the third projection 66.

It can also be seen in FIGS. 3 and 4 that, in the case of a pure or sole vertical movement of the first preheating device 40 along an axis towards or away from the first component 60, the first preheating device 40 would get stuck on the third projection 66, which would lead to damage to and/or destruction of the first component and/or the first preheating device 40. This is prevented by means of the plastic preheating arrangement 1. As already clarified above, the first preheating device 40 is pivotable around a pivot point or respectively an axis of rotation at the first point 22 by means of the pivoting arrangement consisting of pivoting structure 20 and pivoting mechanism 30 during the movement along an axis, here the vertical axis. Due to the resulting angle of rotation between support 10 and first preheating device 40, the first preheating device 40 can then be arranged next to a surface of the first component 60 to be heated. The surface to be heated is here for example the second projection 64. In the case of a pure or sole movement of the first preheating device 40 with the support 10 along a vertical axis, the second projection 64 is covered by the third projection 66, as explained above. However, due to the pivoting movement of the first preheating device 40 simultaneously with the movement along the vertical axis, the bypassing or respectively circumnavigation of this third projection 66 is realizable.

Figure 7:
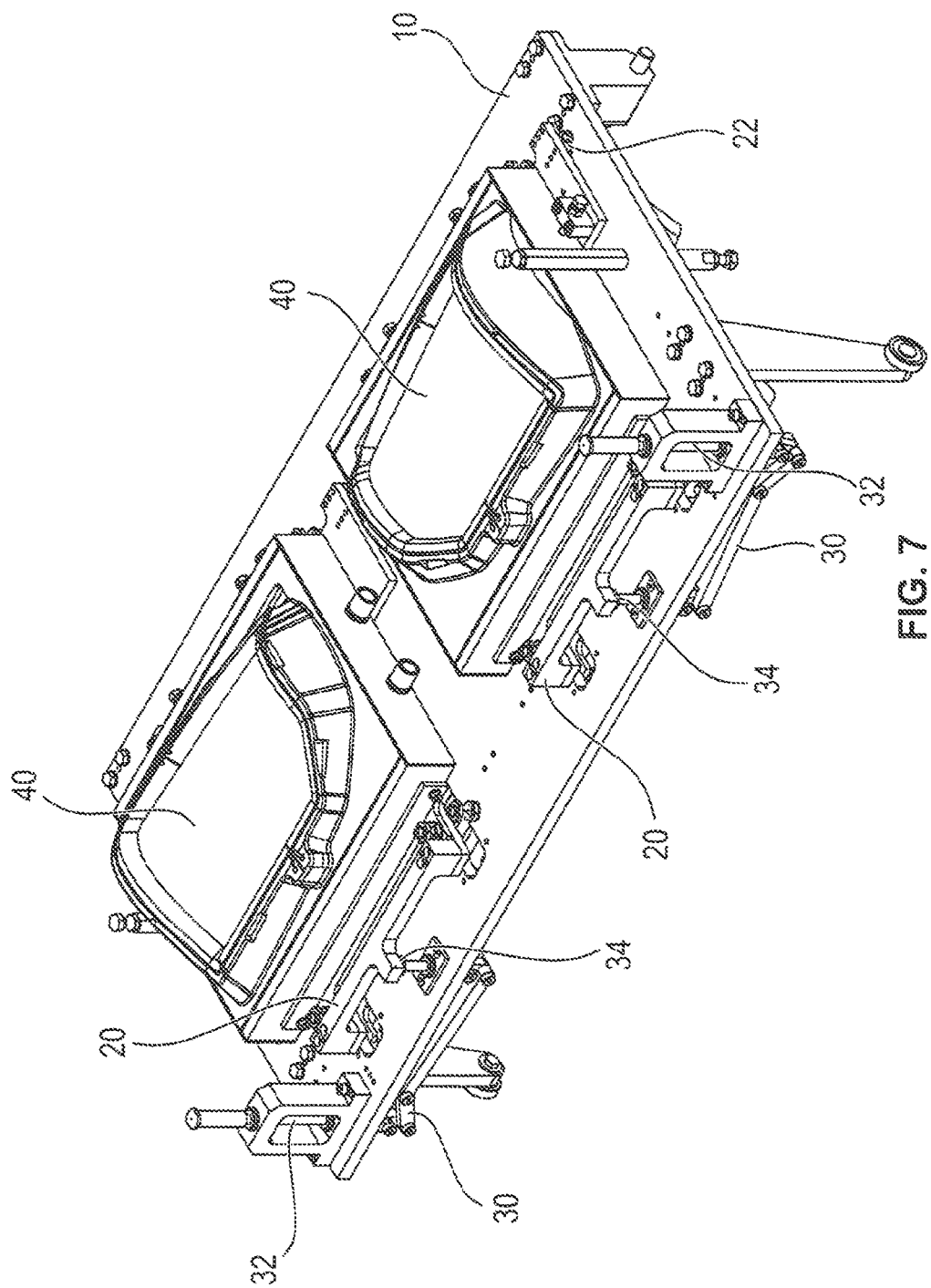
Figure 8:
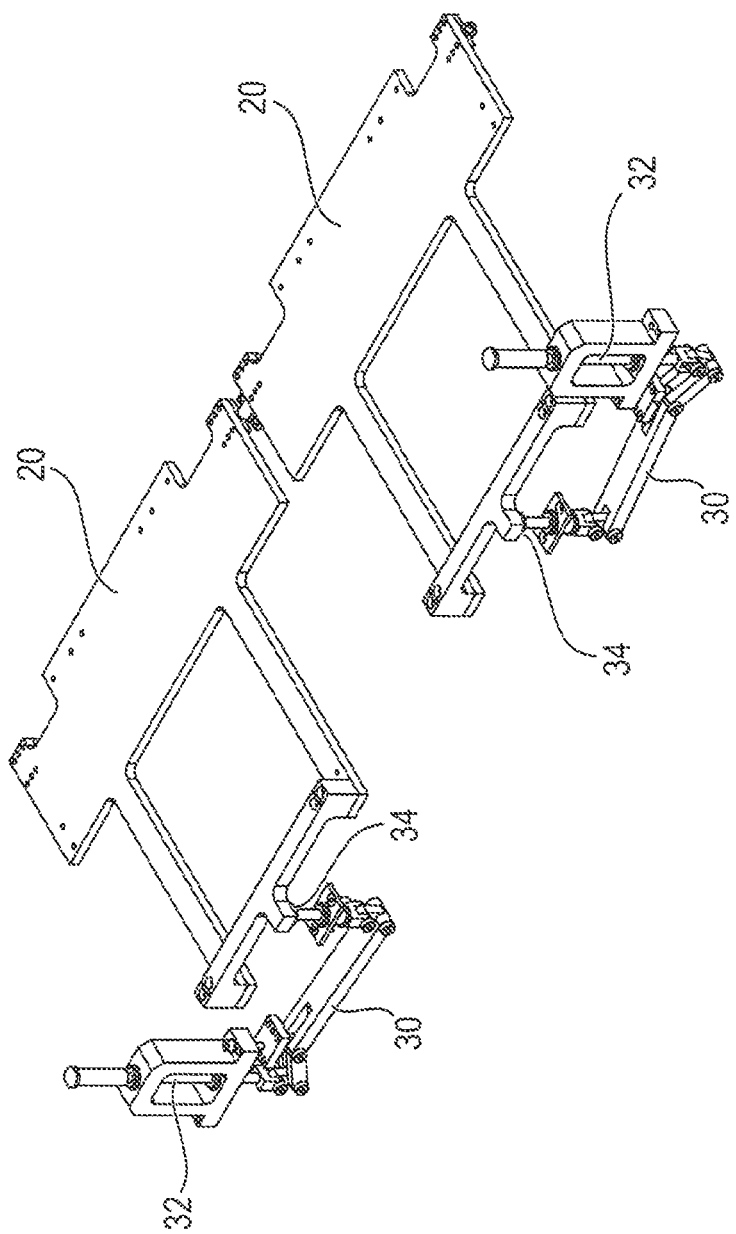

FIG. 7 shows a further embodiment of the plastic preheating arrangement 1. Two first preheating devices 40 are hereby arranged on the support 10. The arrangement also takes place here by means of the pivoting structure 20, which is shown in detail in FIG. 8. The pivoting structure 20 has two first points 22, with which they are later articulated on a support 10. An axis of rotation of the pivoting structure 20 is defined in this manner. On the opposite-lying side of the pivoting structure 20, the pivoting structure 20 engages with the pivoting mechanism 30 at the second point 34. As already explained above, a force on the actuating element 32 in the direction of the support 10 causes a lifting of the pivoting structure 20 at the second point 34. Due to the articulation of the pivoting structure 20 at the first point 22, a pivoting of the pivoting structure 20 around the first point 22 as the axis of rotation thus takes place.

Figure 9:
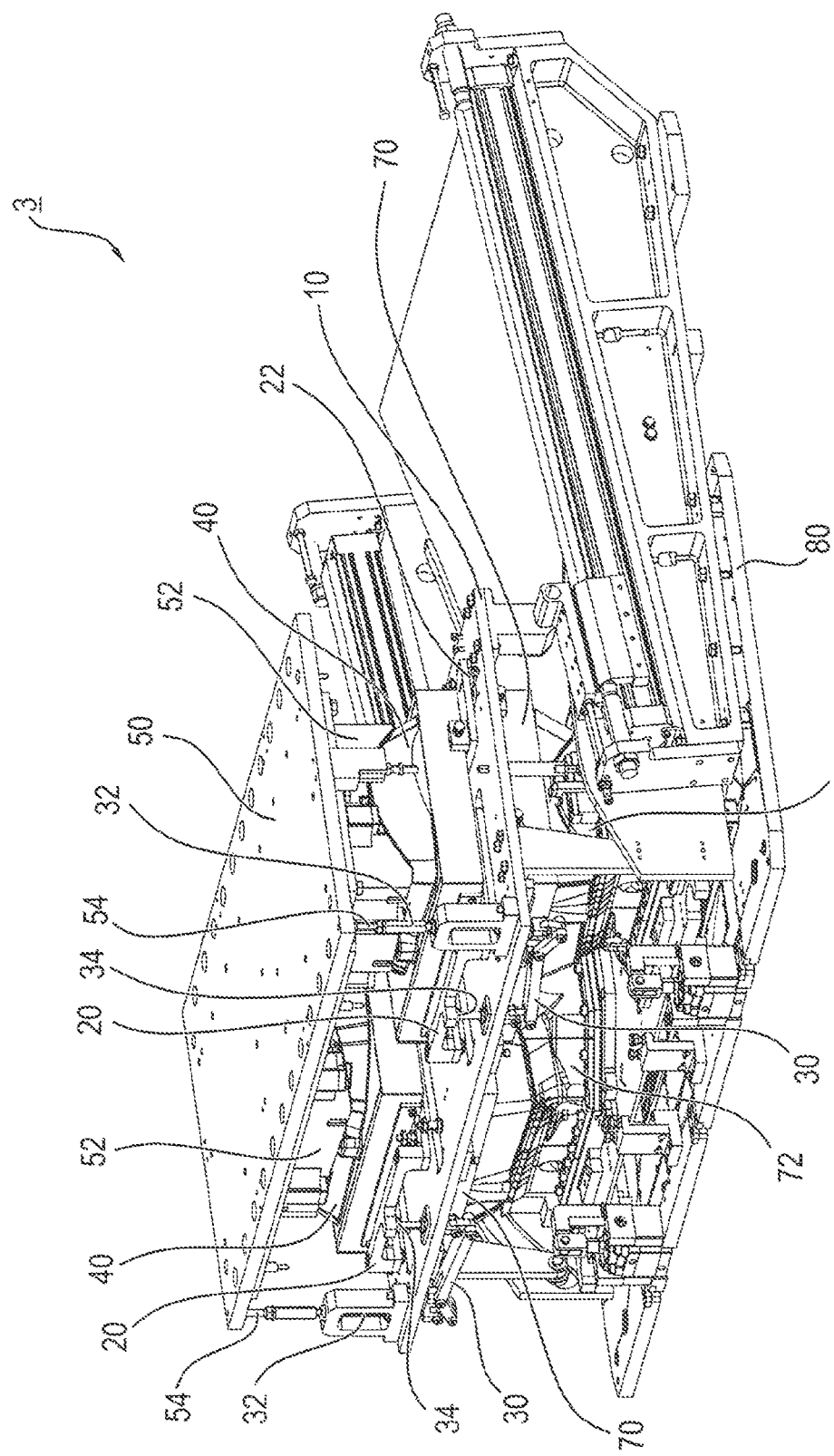
Figure 10:
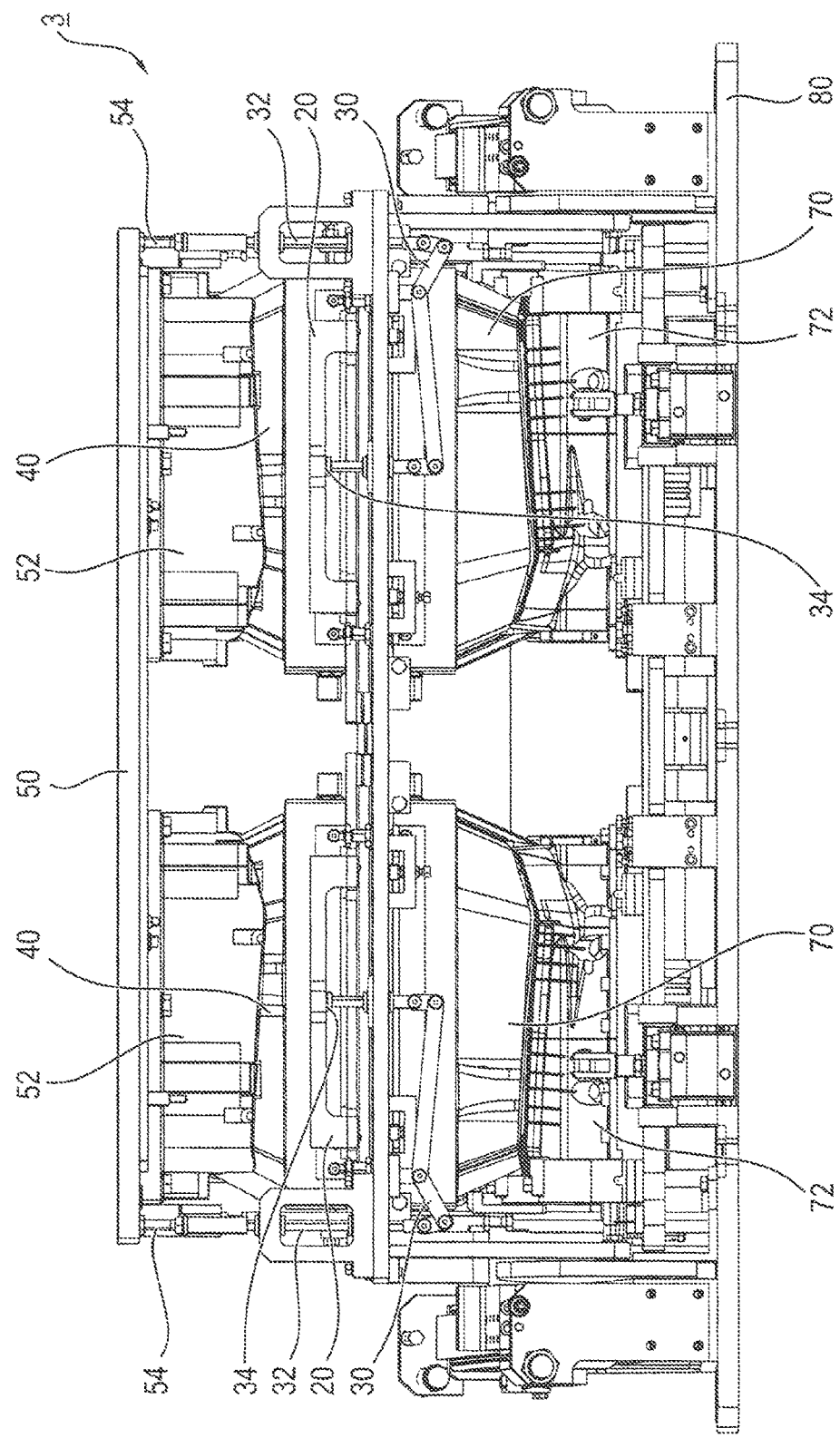

FIGS. 9 and 10 show an embodiment of a plastic welding device 3. The plastic welding device 3 comprises an upper fastening plate 50, a lifting table 80 as well as the plastic preheating arrangement 1. In the example shown, the plastic preheating arrangement 1 is coupled to the lifting table 80 so that a vertical movement of the lifting table 80 also results in a vertical movement of the plastic preheating arrangement 1. However, the plastic preheating arrangement 1 can also have a separate vertical drive without needing to be coupled to the lifting table 80.

Two first tools 52 are arranged rigidly on the upper fastening plate 50. Two second tools 72 are arranged on the lifting table 80. In addition to the components described above, the plastic preheating arrangement 1 also has two second preheating devices 70. The two second preheating devices 70 are rigidly arranged on support 10 on a second surface, which lies opposite the first surface with the first preheating devices 40. Alternatively, the second preheating devices 70 are also equipped with a pivoting arrangement.

Figure 11:
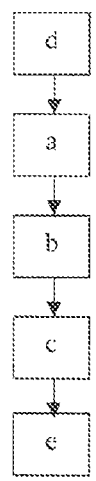

The functioning of a preheating method with the plastic preheating device 1 is described below based on FIG. 11. Starting from the plastic welding device 3 in FIGS. 9 and 10, a movement of the preheating arrangement 1 from an idle position into an operating position first takes place in step d. In the idle position, the preheating arrangement 1 is not arranged between the first 52 and the second tool 72. However, in the operating position, the first preheating device 40 on the first surface of the support 10 is aligned with the first tool 52 of the plastic welding device 3. A movement of the first preheating device 40 of the preheating arrangement 1 in the direction of the first tool 52 takes place in step a simultaneously with or after the movement into the operating position. A first pivoting of the first preheating device 40 from the starting position into the preheating position relative to the first surface of the support 10 takes place simultaneously automatically as of the time when the actuating element 32 comes in contact with the release element 54. The actuating element 32 is in particular a pneumatic, an electric or preferably a mechanical actuating element 32. In the embodiment according to the figures, it is a mechanical actuating element 32. In this manner, the first preheating device 40 circumnavigates at least one undercut in the first component 60. Furthermore, the first preheating device 40 is arranged in the preheating position next to the first tool 52.

A heating at least of a subarea of the surface of the first component 60 then takes place in step b by means of the first preheating device 40. A movement of the first preheating device 40 of the preheating arrangement 1 away from the first tool 52 then takes place in step c. A second pivoting of the first preheating device 40 from the preheating position back to the starting position hereby takes place simultaneously automatically, until the actuating element 32 no longer engages with the release element 54. The first preheating device 40 thus again circumnavigates the at least one undercut in the first component 60.

At the end, a moving of the preheating arrangement from the operating position into the idle position then takes place in step f. This movement can take place after or at the same time as the movement in step c.

While the forms of the invention herein disclosed constitute presently preferred embodiments, many others are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A plastic preheating arrangement for a plastic welding device, comprising:
   a. a support,
   b. at least one first preheating device,
   c. a pivoting arrangement with which the at least one first preheating device can be pivoted relative to a first surface of the support from a starting position into a preheating position, wherein
   d. the pivoting arrangement has
      d1. a pivoting structure, in which the at least one first preheating device is arranged, and
      d2. a pivoting mechanism, wherein
      d3. the pivoting structure is pivotably articulated at at least a first point on the support and engages with the pivoting mechanism at a second point, so that the at least one first preheating device is pivotable from the starting position into the preheating position by actuation of the pivoting mechanism, and
   e. the plastic preheating arrangement is movable in the direction of a first component so that a first pivoting of the first preheating device from the starting position into the preheating position relative to the first surface of the support takes place at the same time with the movement in the direction of the first component automatically, whereby an undercut of the first component can be circumnavigated and the first component can be heated by the first preheating device.

2. The plastic preheating arrangement according to claim 1, wherein the second point lies on a side of the pivoting structure, which is different from the side, on which the pivoting structure is articulated on the support.

3. The plastic preheating arrangement according to claim 2, wherein the pivoting arrangement is pneumatically, electrically or mechanically actuatable.

4. The plastic preheating arrangement according to claim 2, which has a lever mechanism as a pivoting mechanism for pivoting the first preheating device, wherein the pivoting mechanism comprises an actuating element.

5. The plastic preheating arrangement according to claim 1, which also has at least one second preheating device, which is arranged on a second surface of the support opposite the first surface.

6. The plastic preheating arrangement according to claim 5, wherein the at least one first preheating device and/or second preheating device is an infrared preheating device.

7. The plastic preheating arrangement according to claim 1, which has at least two first preheating devices.

8. The plastic preheating arrangement according to claim 7, which has at least two second preheating devices.

9. The plastic preheating arrangement according to claim 1, wherein the at least one first preheating device and/or second preheating device is an infrared preheating device.

10. The plastic preheating arrangement according to claim 1, wherein the starting position is a position in which the at least one first preheating device is arranged at an angle to the first surface of the support of the preheating arrangement.

11. The plastic preheating arrangement according to claim 1, wherein the at least one first preheating device is located in an alignment parallel to the first surface of the support of the preheating arrangement in the preheating position.

12. A plastic welding device, comprising:
   a. a first tool,
   b. a second tool, wherein the first and the second tool are movable relative to each other, so that components arranged in between are weldable by means of the first and the second tool, as well as
   c. a plastic preheating arrangement according to claim 1.

13. The plastic welding device according to claim 12, wherein the plastic welding device is a plastic friction welding device or an infrared welding device.

14. The plastic welding device according to claim 12, wherein the preheating arrangement is movable between an idle position and a preheating position and, in the preheating position, a component is heatable in the associated tool.

15. An infrared plastic welding device, comprising:
   a. a first tool, which is arranged on a first support,
   b. a second tool, which is arranged on a second support, wherein the first and the second tool are movable relative to each other so that components arranged in between are weldable by the first and the second tool, as well as
   c. at least one pivoting arrangement with which the first tool can be pivoted relative to a surface of the respective support from a starting position into a preheating position so that an undercut of a respective component can be circumnavigated and the respective component can be heated by an associated preheating device, wherein
   d. the pivoting arrangement has
      d1. a pivoting structure, in which the first tool is arranged, and
      d2. a pivoting mechanism, wherein
      d3. the pivoting structure is pivotably articulated at at least a first point on the first support and engages with the pivoting mechanism at a second point, so that the first tool is pivotable from the starting position into the preheating position by actuation of the pivoting mechanism.

16. The infrared plastic welding device according to claim 15, wherein the first tool is an upper tool.

* * * * *